Dec. 7, 1948.  J. W. SEIGH  2,455,815
SOLDER SPLASH SHIELDING MEANS
Filed April 27, 1944  2 Sheets-Sheet 1

Inventor
J. W. Seigh
By Mason, Porter & Diller
Attorneys

Dec. 7, 1948. J. W. SEIGH 2,455,815
SOLDER SPLASH SHIELDING MEANS
Filed April 27, 1944 2 Sheets-Sheet 2
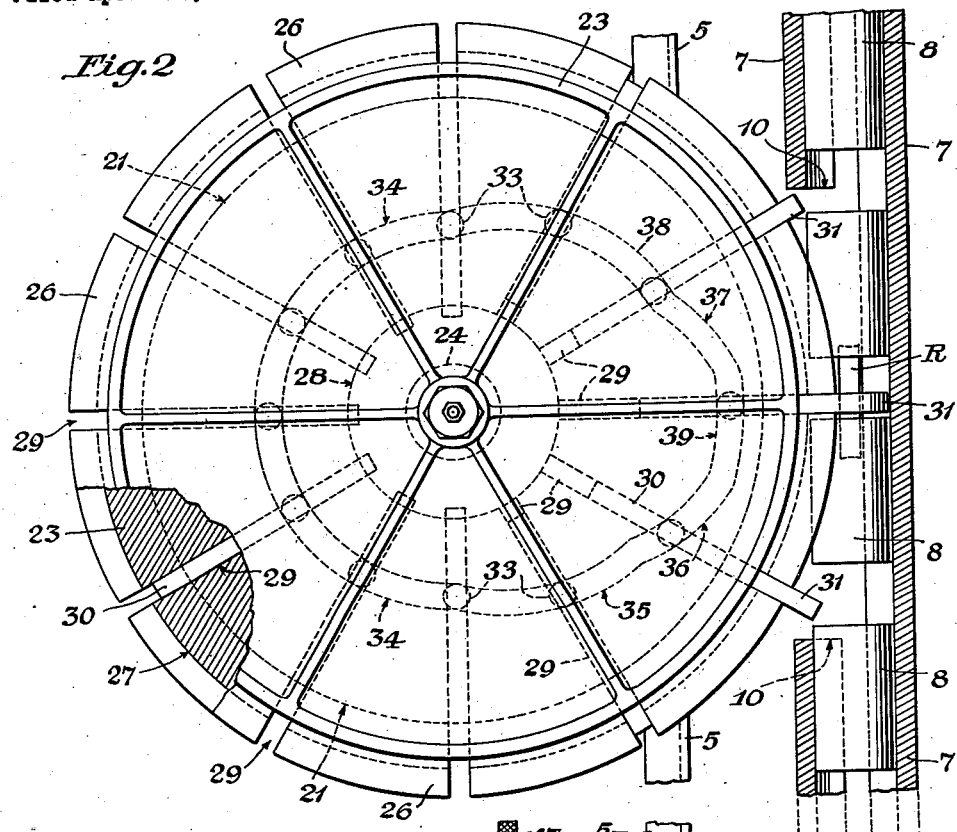
Inventor
J. W. Seigh
By Mason, Porter & Diller
Attorneys Patented Dec. 7, 1948

2,455,815

UNITED STATES PATENT OFFICE 2,455,815

SOLDER SPLASH SHIELDING MEANS

Joseph W. Seigh, Teaneck, N. J., assignor to Continental Can Company, Inc., New York, N. Y., a corporation of New York Application April 27, 1944, Serial No. 533,025

12 Claims. (Cl. 113—97)

1

The invention relates generally to the art of making cans and primarily seeks to provide novel means for shielding the open ends of the formed can bodies, as they are rapidly moved along in spaced relation in the body maker following the solder bonding of the side seams thereof, against the splashing of molten solder bits thrown off by the rapidly rotating solder wiping roll which engages the solder bonded side seams.

In the making of can bodies, body blanks are customarily shaped cylindrically about a forming horn and have their meeting edges hooked together in the form of a longitudinal seam which is secured by a bumping pressure against said horn. Following the formation of this side seam the can bodies are rapidly fed along in longitudinally spaced relation, usually by a feeder lug equipped chain, and while being so fed the side seams are contacted by a soldering roll which rotates beneath the can bodies about an axis disposed parallel the line of feed. Following the soldering of the can body seam a wiper roll rapidly rotating about a horizontal axis disposed transversely of the line of feed contacts the soldered side seams of the rapidly moving can bodies for the purpose of removing excess solder. By reason of the action of centrifugal force and contact of the can body ends with the rapidly rotating solder wiping roll, the roll throws off a spatter of molten solder bits which fly into the open ends of the can bodies, particularly into the advance open ends of the can bodies just as they are starting over the wiper roll.

This spattering or splashing of solder is obviously objectionable because the solder pellets adhere to the interior of the can bodies, often become detached during filling of the cans, and when adhered to lacquered or enameled internal coatings of can bodies, these hot solder bits discolor and sometimes destroy portions of the protective coatings, and corrosion sometimes results. It is, therefore, a purpose of the present invention to provide means for preventing this spattering of solder into the open ended cans as they are being fed along in the body making machine.

In its more detailed nature the invention resides in providing a rotor having a plurality of radial guides and driven in timed relation to the traveling can bodies and with its periphery adjacent the horn or guide through which the cans are fed over the wiper roll, a shield slide radially reciprocable in each rotor guide, and cam means for causing each slide to be projected from the end of its guide into the space between the ad-

2 jacent open ends of two traveling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll.

An object of the invention is to provide a novel solder spatter shielding means of the character stated in which each shield slide has an actuator projection and the cam means comprises a plate cam having a groove therein into which the actuator projections of all of the slides extend, said groove having a concentric dwell portion effective to hold the slides in fully extended position as they approach and pass over the wiper roll, a projector portion effective to rapidly project or extend the slides, and a retractor portion effective to retract the slides or draw them back into their slide guides each time they have completed a spatter shielding function.

Another object of the invention is to provide a novel solder spatter shielding means of the character stated including a novel mounting therefor permitting a swinging away of the rotor and its spatter shields from its operative position in which its periphery is disposed closely adjacent the travelling line of can bodies to an out-of-the-way position.

Another object of the invention is to provide a spatter shielding means mounted in the manner stated, novel means for counter-balancing the weight of the swingably mounted assembly, and means for securing the assembly in either of its operative or out-of-the-way positions.

With the above and other objects in view that will hereinafter appear, the nature of the invention will be more clearly understood by reference to the following detailed description, the appended claims, and the several views illustrated in the accompanying drawing.

In the drawings:

Figure 2 is a plan view illustrating the solder splash shielding means, the horn and a fragment of the rotor being shown in horizontal section.

Figure 3 is a horizontal section taken on the line 3—3 on Figure 1.

Figure 1:
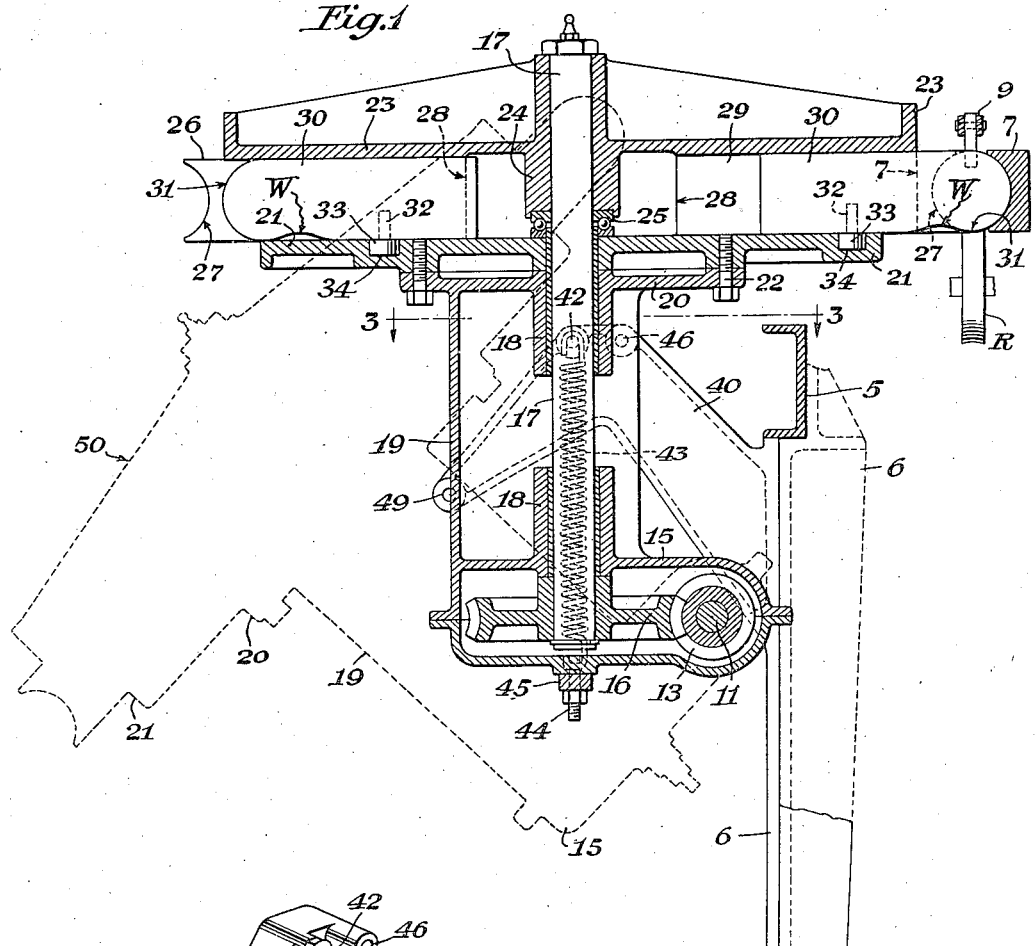
Figure 1 is a vertical cross sectional view illustrating the invention.
Figure 4:
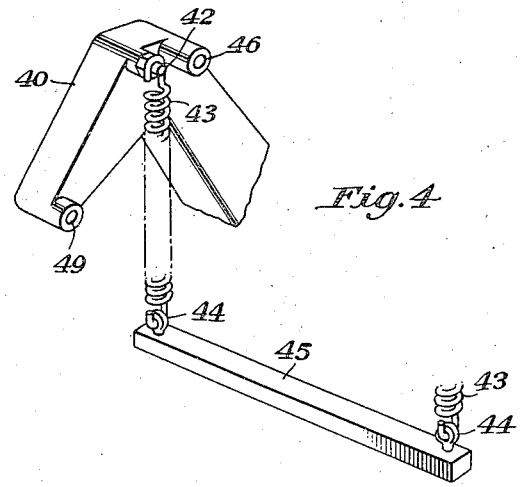
Figure 4 is a fragmentary perspective view illustrating the weight counter-balancing spring equipment and the mounting thereof.

In the example of embodiment of the invention herein disclosed, 5 designates one of the longitudinal beams forming a part of the body maker framing, and 6 one of the upright supports of said frame structure. The outside horse or horn customarily provided in can body makers is indicated at 7, and the formed can bodies 8 are rapidly conveyed through the horn in processional order and longitudinally spaced relation by a conveyor chain 9 in the manner well known to workers in the art. The portion of the body maker herein disclosed, that is the horse or horn 7 indicated in Figures 1 and 2, is that portion disposed beyond the solder bonding station at which the molten solder is applied to the side seams of the can bodies for solder bonding the seams. Immediately after the solder bonding of the side seams, the can bodies are conveyed over the conventional, rapidly rotating wiping roll R which is effective to wipe surplus molten solder from the solder bonded side seams. In order to accommodate the mechanism of the invention, one side of the horn 7 is cut away as at 10. See Figure 2.

A driver shaft 11 extends along one side of the conventional body maker framing, and this shaft is mounted in a bearing 12 suitably supported on the frame in the manner clearly illustrated in Figure 3. The shaft is driven by any suitable means (not shown) in properly timed relation to the can body conveying chain 9. A worm gear 13 is fixed on the shaft 11 between bearings 14 forming a part of a gear housing 15 wherein the worm gear meshes with a worm wheel 16 secured on the lower end of an upright shaft 17. See Figures 1 and 3. The shaft 17 is rotatable in bearings 18 provided in an upright extension 19 of the housing 15, said extension being equipped at its upper extremity with a top plate 20. It will be observed by reference to Figure 1 that a plate cam 21 is secured as at 22 on the top plate 20, and the purpose of this cam will become apparent as this disclosure progresses.

A rotor 23 is secured to the upper end of the shaft 17, and the rotor includes a center hub 24 which rests on anti-friction bearings 25 above the plate cam 21, and a peripheral extension 26 which is peripherally grooved as at 27 so as to conform in curvature at its periphery to the external curvature of the can bodies, thereby to enable the periphery of the rotor to extend into the side recess or cut-out 10 in the horn 7 in the manner clearly illustrated in Figure 2. The main rotor body terminates inwardly in a clearance 28 surrounding the center hub 24 and is provided with plurality of radial grooves or guides 29. Twelve such guides or grooves are illustrated in this disclosure, but it is to be understood that a greater or lesser number may be employed.

A solder splash shielding slide or blade 30 is readily reciprocable in each guide or groove 29, and each slide or blade is equipped at its outer end with an extremity rounded as at 31 to conform in curvature to the external curvature of the can bodies 8 so that it can pass in close proximity to the interior of the horn as the blade end approaches and passes over the wiper roll in the manner clearly illustrated in Figure 2. Each slide or blade 30 also is equipped with a depending actuator extension 32 on which is mounted a roller 33, and all of the rollers 33 engage in a cam groove 34 formed in the upper face of the plate cam 21. It will be apparent by reference to Figure 2 of the drawings that the plate cam groove 34 includes a blade projecting portion formed in two projecting stages 35 and 36, a blade retracting portion formed in two retracting stages 37 and 38 and an intermediate concentric dwell portion effective to hold the blades fully projected or extended as they approach and pass over the wiper roll R in the manner clearly illustrated in Figure 2.

A bracket arm 40 is secured to the frame structure at the side of the housing extension 19 in the manner clearly illustrated in Figures 1 and 2 of the drawings, and another bracket arm 41 is secured to the framing at the opposite side of said housing in the manner clearly illustrated in Figure 3. Each bracket arm is equipped with a spring anchor 42 to which the upper end of retractile spring 43 is secured, and the lower end of each spring 43 is secured as at 44 to bar 45 which extends under and supports the weight of the housing 15, 19 in the manner clearly illustrated in Figures 1 and 3.

Each of the brackets 40 and 41 is equipped with a socket 46 for receiving a securing pin 47 which is insertable through the socket into a receiving socket 48 formed at the respective side of the housing extension 19 in the manner clearly illustrated in Figure 3. One or both brackets 40 and 41 also may be equipped with a socket 49 through which the securing pin may be inserted into the housing socket for securing the whole apparatus in the out-of-the-way position illustrated in dotted lines at 50 in Figure 1.

It will be obvious by reference to Figures 1 and 3 of the drawings that the housing 15, 19, the cam 21 and the rotor 23 rotatable thereover are swingable as a unit about the axis of the shaft 11 from the operative position illustrated in Figures 1 and 2 to the out-of-the-way position illustrated at 50 in Figure 1. The securing pin and socket 47, 46, 48 or 47, 49, 48 will serve to secure the apparatus in either the operative or out-of-the-way position, and it will be obvious that the apparatus can be swung between said positions without disturbing the drive connections between the shaft 11 and the rotor 23.

When the apparatus is in the operative position illustrated in Figures 1 and 2, the rotor 23 rotates in properly timed relation to the travelling can bodies 8 so that one of the solder splash shielding blades 30, 31 will be projected into the space between the adjacent open ends of two travelling can bodies so as to travel in said space and shield the open advance end of the oncoming can body as it approaches and is passing over the wiper roll R. After each blade has performed its function of closing the open end of the oncoming can body against spattering of molten solder thereinto from the roll R, the blade will be retracting again into its guiding groove 29. It will be obvious by reference to Figure 2 that the blade projecting portions 35, 36 of the cam groove will project the blades into the spaces between the can bodies in two stages, that is one distinct stage as the blade approaches the space into which it is to be projected, and another stage as it actually moves into said space. The same is true of the retraction of the blades. The movement of each blade out of the space between two can bodies ends is rapidly effected by the first stage retraction portion 37 of the cam groove, and the remainder of movement of retraction of the blades is effected by the second stage retracting portion 38 of the cam groove. As before described, the concentric dwell portion 39 of the cam groove holds each blade in the fully projected position as the open can end which it is shielding approaches and passes over the wiper roll R.

As stated hereinabove, the outer ends of the blades are curved at 31 to conform to the external curvature of can bodies and the curvature of the groove in the wiper roll R, and in order to assure against breaking down of the roll groove defining edge nearest the rotor by passage of blades thereover the blades have their under surfaces recessed as at W.

It will be apparent by reference to Figure 2 of the drawings that each blade 30 has a snug sliding fit in its mounting groove 29. Thus each time a blade is retracted in its groove or guide 29 as shown in the left in Figure 2 all gobs of solder which may have stuck to the blade during its previous projection will be scraped off by engagement with the outer edges defining said groove and the blade will be clean when projected again.

It will also be obvious that feature of mounting the whole shielding apparatus so that it can be swung to the out-of-the-way position 50 illustrated in dotted lines in Figure 1 is very advantageous in the manner in which it simplifies the changing of blades, as when the body maker is changed from one base diameter to another.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll.

2. In apparatus of the character described, a horn along which can bodies having freshly soldered side seams are moved in equidistantly spaced relation, a wiping roll engageable with the side seams of the travelling can bodies for wiping surplus solder therefrom, a carrier driven in timed relation to the travelling can bodies and having guide slots therein, a blade in each slot and having a snug sliding fit therein, and means for causing each slide to be projected from the slot in which it is mounted into the space between the adjacent open ends of two travelling can bodies and travel in said space shielding the open advance end of the oncoming can body as it approaches and is passing over the wiper roll and then be retracted again within said slot, thereby to shield the open end of each oncoming can body against the spattering of solder thereinto from the wiper roll, each said slot presenting edge portions against which the blades drag when retracted and which strip off solder gobs tending to adhere to said blades.

3. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and means including a stationary cam operatively engaged with said slides and effective for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll.

4. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said rotor having a grooved periphery conforming in cross sectional shape to the external curvature of the travelling can bodies at one side, and said horn having a portion of one side cut away at the position of the rotor so that the grooved periphery of the rotor can partially embrace passing can bodies.

5. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said rotor having a grooved periphery conforming in cross sectional shape to the external curvature of the travelling can bodies at one side, and said horn having a portion of one side cut away at the position of the rotor so that the grooved periphery of the rotor can partially embrace passing can bodies, each said spatter shield slide having its outer end extremity rounded to conform to the curvature of the can bodies so that it can pass in close proximity to the interior of the horn as the blade end approaches and passes over the wiper roll.

6. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said cam means comprising a stationary plate cam having an actuator groove therein, and each said spatter shield slide having an actuator projection engaging in said actuator groove.

7. On apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said cam means comprising a stationary plate cam having an actuator groove therein, and each said spatter shieldslide having an actuator projection engaging in said actuator groove, having a concentric dwell portion effective to hold the slides in fully extended position as they approach and pass over the wiper roll, a projector portion effective to rapidly project the slides, and a retractor portion effective to retract the slides each time they have completed a spatter shielding function.

8. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said cam means comprising a stationary plate cam having an actuator groove therein, and each said spatter shield slide having an actuator projection engaging in said actuator groove, and said actuator groove having a concentric dwell portion effective to hold the slides in fully extended position as they approach and pass over the wiper roll, a projector portion effective to rapidly project the slides, and a retractor portion effective to retract the slides each time they have completed a spatter shielding function, and each projector and retractor groove portion being shaped to perform its slide projecting or retracting function in two distinct stages.

9. In apparatus of the character described, a horn along which can bodies having freshly soldered side seams are moved in equidistantly spaced relation, a wiping roll engageable with the side seams of the travelling can bodies for wiping surplus solder therefrom, a rotor driven in timed relation to the travelling can bodies with its periphery disposed adjacent said horn and having a plurality of equidistantly spaced radially disposed guides thereon, a solder spatter shield slide reciprocable in each guide, and cam means for causing each slide to be projected from the end of its guide into the space between the adjacent open ends of two travelling can bodies and travel in said space shielding the open advance end of the oncoming can body as it approaches and is passing over the wiper roll, and then be retracted again within its guide, thereby to shield the open end of each oncoming can body against the spattering of solder thereinto from the wiper roll, said rotor being mounted at the upper end of a shaft having a worm wheel fixed thereon to which rotation is imparted by a worm gear fixed on a horizontal driver shaft, a support for said rotor and its shaft, said cam means comprising a stationary plate cam mounted on the support directly beneath the rotor and having an actuator groove therein open toward the rotor, and each spatter shield slide having an actuator projection engaging in said cam groove.

10. In apparatus of the character described, a horn, means for feeding can bodies having freshly soldered side seams along said horn in equidistantly spaced relation, a wiping roll engageable with the side seams of the travelling can bodies for wiping surplus solder therefrom, a driven member driven in timed relation to said feeding means and having means thereon for projecting between travelling can bodies for shielding them against spattering of solder thereinto as they approach and pass over the solder wiping roll, said horn being cut away along one side at the position of said driven member, and said driven member having a concave peripheral portion conforming generally in shape to the external curvature of the cans being fed through the horn and normally disposed to oppose and partially guide cans passing through the horn where it is cut away, and means swingably mounting said member so that it can be readily swung into and away from its operative position adjacent the horn to an out-of-the-way position without disturbing the timed relation of the can body feeding means and the resulting positioning of the shielding means effective for projecting between can bodies being moved by said feeding means.

11. In apparatus of the character described, a horn along which can bodies having freshly soldered side seams are moved in equidistantly spaced relation, a wiping roll engageable with the side seams of the travelling can bodies for wiping surplus solder therefrom, a rotor having means thereon for projecting between travelling can bodies for shielding them against spattering of solder thereinto as they approach and pass over the solder wiping roll, a horizontal driver shaft, an upright driven shaft to which the rotor is affixed, a worm gear couple connecting the driver shaft and the driven shaft in driving relation, a support for the driven shaft and the rotor, said horn being cut away along one side at the position of said rotor member, and said rotor member having a concave peripheral portion conforming generally in shape to the external curvature of the cans being fed through the horn and normally disposed to oppose and partially guide cans passing through the horn where it is cut away, and means swingably mounting the support for movement about the axis of the drive shaft so that the support and rotor can be swung away from their operative position to an out-of-the-way position without breaking the drive connections between the driver shaft and the rotor.

12. In apparatus of the character described, a horn along which can bodies having freshly soldered side seams are moved in equidistantly spaced relation, a wiping roll engageable with the side seams of the travelling can bodies for wiping surplus solder therefrom, a rotor having means thereon for projecting between travelling can bodies for shielding them against spattering of solder thereinto as they approach and pass over the solder wiping roll, a horizontal driver shaft, an upright driven shaft to which the rotor is affixed, a worm gear couple connecting the driver shaft and the driven shaft in driving relation, a housing for the driven shaft and said worm gear couple and supporting the rotor on said driven shaft, means swingably mounting said housing for movement about the axis of said driver shaft so that the rotor can be swung away from its operative solder spatter shielding position to an out-of-the-way position without disturbing the worm gear couple, means connected with the housing for yieldably holding the housing and the supported rotor in said operative position and constantly tending to return it to said operative position when swung away, means for securing the housing in said operative position, and means for securing the housing in said out-of-the-way position.

JOSEPH W. SEIGH.

REFERENCES CITED

The following references are of record in the file of this patent:

UNITED STATES PATENTS

| Number | Name | Date |
| --- | --- | --- |
| 550,176 | Jensen | Nov. 19, 1895 |
| 1,954,733 | Hansen | Apr. 10, 1934 |
| 1,985,906 | Smith | Jan. 1, 1935 |
| 2,266,792 | O'Neil | Dec. 23, 1941 |
| 2,322,221 | Cereghine | June 22, 1943 |